United States Patent

[11] 3,613,517

[72] Inventors Chester D. Bradley
 Darien;
 Malcolm C. Tate, Stamford, both of Conn.
[21] Appl. No. 20,747
[22] Filed Mar. 18, 1970
[45] Patented Oct. 19, 1971
[73] Assignee The A. H. Emery Company
 New Canaan, Conn.

[54] TENSION LOAD CELL
 5 Claims, 5 Drawing Figs.
[52] U.S. Cl. .................................................. 92/98, 177/208
[51] Int. Cl. .................................................. F16j 3/00
[50] Field of Search .................................... 92/98, 99, 100, 101; 73/406; 177/208

[56] References Cited
UNITED STATES PATENTS

| | | | |
|---|---|---|---|
| 1,214,745 | 2/1917 | Beard et al. .................. | 177/208 |
| 2,592,501 | 4/1952 | Williams ....................... | 177/208 X |
| 2,934,092 | 4/1960 | Saunders ...................... | 177/208 X |
| 3,339,462 | 9/1967 | Bankowski ................... | 92/23 |
| 3,354,973 | 11/1967 | Farquhar ...................... | 177/208 |

*Primary Examiner*—Martin P. Schwadron
*Assistant Examiner*—Leslie J. Payne
*Attorney*—Blair, Cesari and St.Onge ABSTRACT: A piston-cylinder type load cell for the measurement of tension loads. The piston and cooperating cylinder portions are ring-shaped and surround an open central passage through the cell which accommodates a simple, external tension loading member. The piston and cylinder carrying members may be assembled about roller bearings for free relative axial and angular telescopic movement even under high-cross loads. The cell may also be provided with a flexible diaphragm which extends over the roller bearings and is secured to form an integral dust jacket.

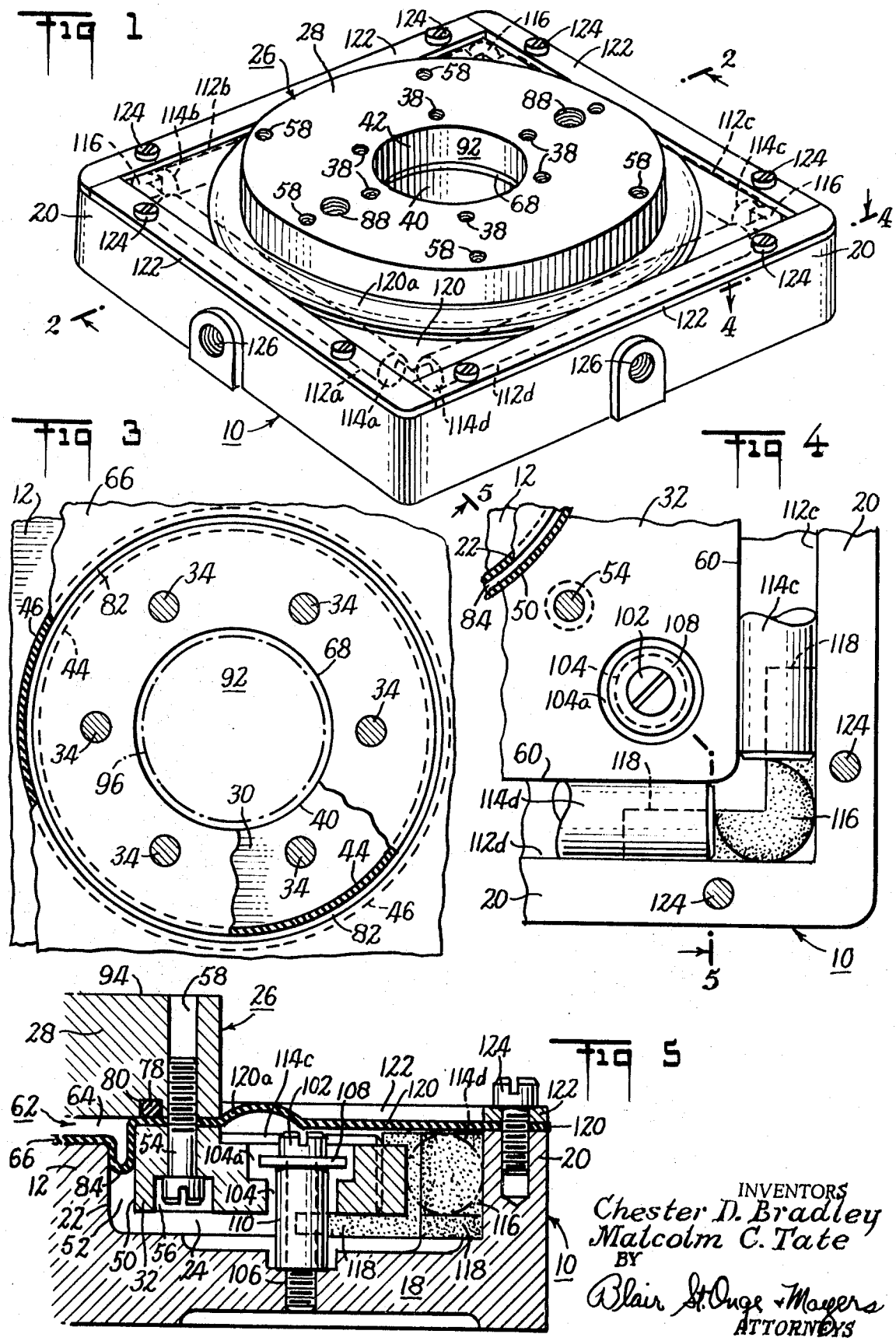

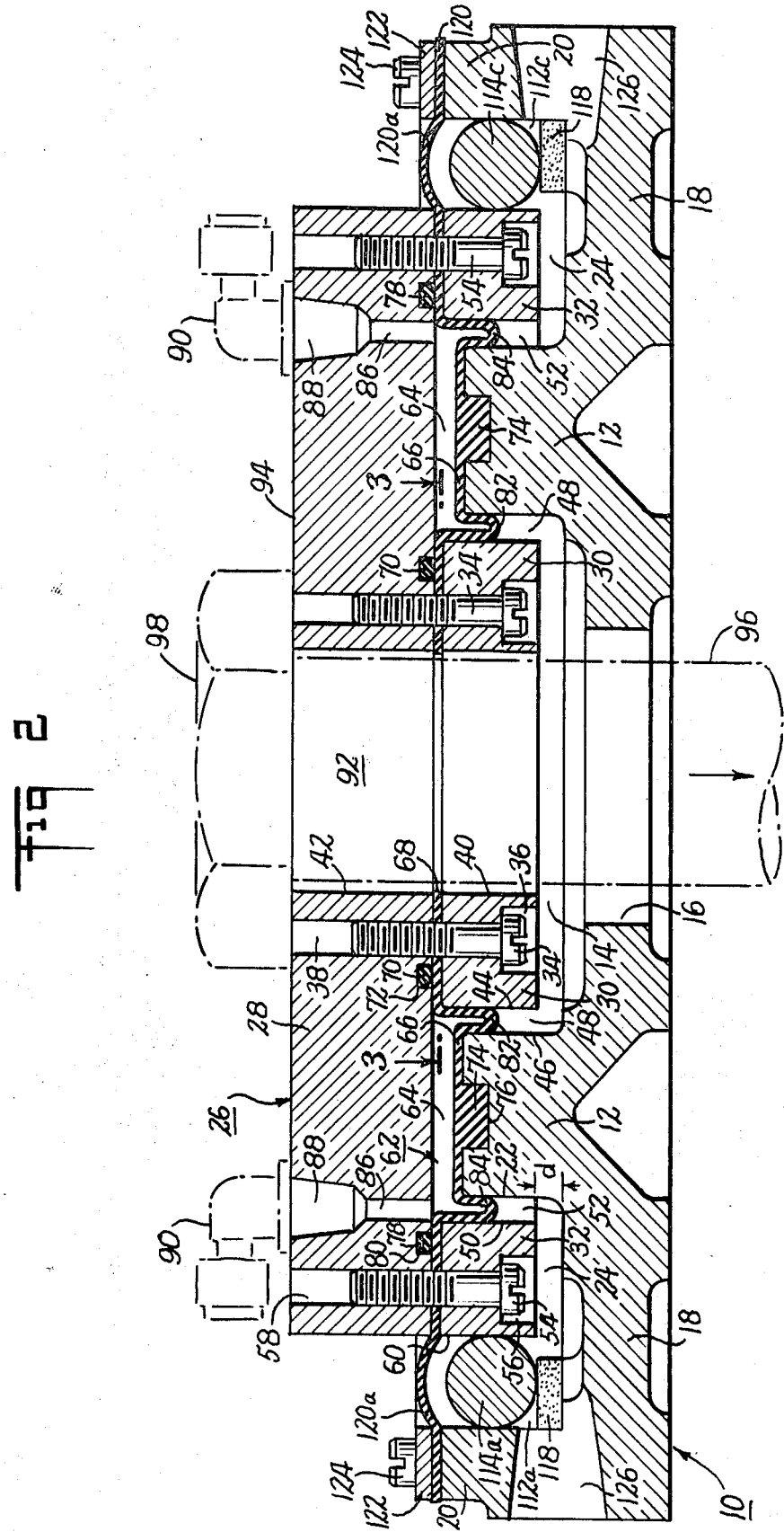

TENSION LOAD CELL

BACKGROUND OF THE INVENTION

Hydraulic load cells, such as those, for example, described in prior U.S. Pat. Nos. 2,960,113 and 3,089,519, are typically constructed primarily for the measurement of compressive loads. Accordingly, in order to adapt such cells for use under tensile loads, additional internal mechanism has had to be built into the cells. This internal mechanism has typically taken the form of a draw bar or plate connected with a tension rod or bar at one end and with either the piston or cylinder carrying member of the cell at the other end. The use of such additional mechanism, which for convenience may be termed a yoke, has added significantly to the complexity, bulk and cost of prior art tension responsive load cells.

Additionally, as is more fully discussed in the copending application entitled Load Cell With High Cross Loading Capacity, filed concurrently herewith, prior art hydraulic load cells (including the tension type) have not been fully satisfactory in resisting binding and torque or avoiding inaccuracy due to cross loading. They have also required separate dust jacket structures to protect their moving parts from abrasive or corrosive contaminants in the atmosphere.

Accordingly, representative objects of the present invention are to provide a load cell adapted for use under tensile loads which is simple in construction, compact, capable of withstanding high levels of cross loading and torque, which has an integral dust jacketing structure and which is accurate, reliable and inexpensive to produce.

SUMMARY OF THE INVENTION

The present invention relates to hydraulic load cells and more particularly to a load cell construction particularly adapted to use in measuring tensile loads.

The load cell comprises a base member having an upstanding piston portion in the shape of a ring. An opening through the base member is also provided in the central well of the piston portion. The base member is assembled telescopically with a cylinder defining member comprising a cap block having inner and outer cylinder rings projecting coaxially from one surface thereof. The inner and outer cylinder rings thus define between them a ring-shaped cylinder portion which telescopically receives the piston portion when the inner cylinder ring is inserted into the central well thereof.

A sealed fluid pressure chamber for hydraulic fluid is provided between the cylinder and piston portions by means of an interposed flexible, elastomeric diaphragm. The diaphragm is further provided with a central opening coaxial with the opening in the base member.

An opening is also provided through the cap block which is coaxial and thus communicates with the corresponding openings in the inner cylinder ring, the flexible diaphragm and the base member; these openings thus constitute an open central passage through the load cell through which a tension loading member can be extended. The tension loading member, for example, may be an eye bolt, hook or threaded rod connected with means which bear against the loading surface of the cap block at one end. The loading member thus exerts a corresponding compressive force against the loading surface when tension is applied to the opposite end extending through the central passage in the cell. By thus providing a central passage through the cell which accommodates a simple external loading member, the need for an additional internal yoke arrangement, bulk, complexity and concomitant cost, is eliminated.

The base member and cylinder defining member are preferably telescopically assembled about linear roller bearings to give the cell great resistance to torque, and to binding resulting from cross loading. Also preferably, the flexible diaphragm extends laterally, and concomitant cost, is eliminated.

The base member and cylinder defining members are preferably telescopically assembled about linear roller bearings to give the cell great resistance to torque, and to binding resulting from cross loading. Also preferably, the flexible diaphragm extends laterally, and is secured over the roller bearing races to produce an integral dust jacket for protection against contaminants.

BRIEF DESCRIPTION OF THE DRAWINGS

For a fuller understanding of the nature and objects of the invention, reference should be had to the following detailed description taken in connection with the accompanying drawings in which:

FIG. 1 is a front perspective view of the tension load cell of the invention.

FIG. 2 is an enlarged elevation view in sections taken along line 2—2 of FIG. 1 and showing the open central passage through the load cell.

FIG. 3 is a partial top plan sectional view taken along line 3—3 of FIG. 2.

FIG. 4 is a partial sectional view taken along line 4—4 of FIG. 1.

FIG. 5 is a partial sectional view taken along line 5—5 of FIG. 4.

Similar reference characters refer to similar parts throughout the several views of the drawings.

DESCRIPTION OF THE PREFERRED EMBODIMENTS

Referring now to FIGS. 1 and 2, the load cell of the invention comprises a base or piston carrying member 10 having a raised, central piston portion 12 in the shape of a circular ring. Piston portion 12 contains a depressed central well 14 having an opening 16 extending from the bottom thereof completely through base member 10. Piston portion 12 is also surrounded by a lateral flange 18 which terminates in a raised outer rim 20, preferably of square configuration as shown in FIG. 1. Rim 20 in conjunction with the outer sidewall 22 of piston portion 12 thus define between them a ring-shaped outer well 24 surrounding piston portion 12, the well 24 being of circular configuration along its inner diameter and of square configuration along its outer diameter (FIG. 4.)

A cylinder defining member 26 is telescopically assembled with base member 10 as shown in FIG. 2. Member 26 comprises a flat cap block 28 of preferably cylindrical configuration (FIG. 1) to which are concentrically mounted a pair of cylinder rings 30 and 32 (FIG. 2). The inner cylinder ring 30 is secured around the center of cap block 28 by a series of cap screws 34 (FIGS. 2 and 3) which pass through counterbored holes 36 in inner cylinder ring 30 and into threaded engagement with corresponding tapped holes 38 in cap block 28. As shown, the opening 40 through inner cylinder ring 30 is also concentric to and communicates with the respective corresponding openings 16 and 42 through base member 10 and cap block 28. Inner cylinder ring 30 is further provided with a cylindrically configured outer surface 44 which corresponds with the cylindrical configuration of the wall 46 of central well 14. The diameter of inner cylinder ring 30, however, is less than the diameter of well 14 so that a clearance space 48 (FIG. 2) is left therebetween when inner cylinder ring 30 is telescopically assembled within well 14.

The outer cylinder ring 32 has a cylindrically configured inner surface 50 corresponding to the cylindrical outer wall 22 of piston portion 12. The inner diameter of outer cylinder ring 32, however, is greater than the outer diameter of piston portion 12 so that a second clearance space 52 (FIG. 2) is left therebetween when outer cylinder ring 32 is telescopically assembled within outer well 24. Outer cylinder ring 32 like inner cylinder ring 30 is secured to cap block 28 by a series of cap screws 54 which pass through counterbored holes 56 and into threaded engagement with corresponding tapped holes 58 in cap block 28. Outer cylinder ring 32 as shown in FIG. 4 is further provided with an outer surface 60 of square configuration, corresponding to the square configuration of rim 20; ring 32 thus corresponds at both its inner and outer surfaces to the configuration of the adjacent walls of well 24 into which it is telescopically received as shown in FIGS. 2 and 5.

Still referring to FIGS. 2 and 5, it can be seen intended the space between inner cylinder ring 30 and outer cylinder 32 comprises a cooperating, ring-shaped cylinder portion 62 for piston portion 12. The upper portion of the space between piston portion 12 and cylinder portion 62 further comprises a sealed, fluid pressure chamber 64 which may be filled with hydraulic fluid, the pressure transferring medium of the hydraulic load cell.

Pressure chamber 64 is provided by interposing a flexible diaphragm 66 between cylinder portion 62 and piston portion 12 as shown in FIG. 2. Flexible diaphragm 66 is preferably formed from a fluid impervious, nonstretching sheet material of synthetic fiber such as Dacron coated with an elastomer such as rubber or the like; it is provided with a central opening 68 which is positioned coaxially with the openings 16, 40 and 42 respectively in base member 10, inner cylinder ring 30 and cap block 28. The area of diaphragm 66 adjacent opening 68 is clamped between inner cylinder ring 30 and cap block 28 as shown in FIG. 2. Further, an O-ring seal 70 is preferably provided in a recess 72 in cap block 28 on the surface abutting the flexible diaphragm to form a fluidtight seal. As shown, diaphragm 66 lays along the top of piston portion 12 and is preferably provided with a protruding, ring-shaped ridge 74 which fits into a mating ring-shaped recess 76 in the top of piston portion 12. Ridge 74 thus helps to position and secure the diaphragm. Diaphragm 66 is further clamped toward its outer periphery between outer cylinder ring 32 and cap block 28. Preferably, an O-ring seal 78 is provided in a corresponding recess 80 in cap block 28 at this point as well.

As further shown in FIG. 2, a pair of slack diaphragm folds 82 and 84 are permitted to protrude into the respective clearance spaces 48 and 52 between the piston portion and the two cylinder rings. The purpose of folds 82 and 84 is to provide sufficient slack in diaphragm 66 so that the piston and cylinder portions can move axially relative to one another without overstressing or rupturing the diaphragm, while maintaining a precise acting area.

A pair of pressure ports 86 are also provided at opposite sides of cap block 28 in communication with pressure chamber 64 (FIG. 2). The ports 86 each preferably terminate in an external fitting 88 to which a pressure line 90 may be connected. The pressure line may then be further connected to a pressure sensing instrument for monitoring the load cell output.

Still referring to FIG. 2, the openings 16, 40, 68 and 42, respectively in base member 10, inner cylinder ring 30, diaphragm 66 and cap block 28 are all coaxially aligned and in communication; they thus form a central open passage 92 completely through the load cell along the axis of the piston and cylinder portions. Central passage 92 provides a means whereby a tension loading member such as an eye bolt, hook or threaded rod may be accommodated in cooperating relationship with the upper loading surface 94 of cap block 28.

As a specific example, the tension loading member may comprise a threaded rod 96 extending axially through passage 92 with a nut 98 secured thereto and resting against cap block 28. Rod 96, when subjected to tension forces acting in the direction of the arrow, causes a corresponding compression force to be exerted against loading surface 94 of cap block 28. Cap block 28 in turn exerts a corresponding force against the fluid confined in chamber 64. The resulting hydraulic pressure will then register on any pressure sensitive instrument monitoring the load cell output. It can be seen that by providing central passage 92, a simple, external tension loading member is readily accommodated by the load cell without appreciable increase in either bulk or complexity. This is in contrast to prior art tension load cells which require additional complicated and bulky internal yoke mechanisms.

Referring now to FIGS. 4 and 5 member 26 is loosely held to base member 10 by a pair of positioning screws 102 passing through diagonally opposite corners of outer cylinder ring 32. Each positioning screw 102 (FIG. 5) passes loosely through a counterbored clearance hole 104 in cylinder ring 32 and is threadedly secured at 106 to base member 10. Each screw 102 is also provided with a flange 108 which fits within the counterbore 104a, but which is of larger diameter than clearance hole 104. Screws 102 thus permit relative axial and angular movement, between members 10 and 22 but prevent accidental or inadvertent total separation thereof. Each screw 102 is also preferably provided with a sleeve 110 to accurately position flange 108.

To facilitate relative axial and angular movement between members 10 and 26, and to prevent binding under cross loading, they are preferably assembled about roller bearings. As shown in FIGS. 1, 2 and 4, a relatively wide space is left between outer surface 60 of outer cylinder ring 32 and the inner wall of rim 20; this relatively wide space actually consists of four separate, linear channels 112a, 112b, 112c and 112d which form four elongated, linear races between outer cylinder ring 32 and rim 20.

Preferably, a single elongated, linear roller bearing 114a, 114b, 114c and 114d is provided in each corresponding race so that it maintains rolling contact with both outer surface 60 of outer cylinder ring 32 and the inner surface of rim 20. A resilient, elastomeric bumper 116 (FIGS. 4 and 5) is preferably provided in the space between the ends of adjacent roller bearings to help prevent their lateral movement and keep them substantially centrally positioned within their respective races. Further, a rectangular, resilient elastomeric pad 118 (FIGS. 2 and 4) is preferably provided at each end of each roller bearing. It can be seen that as a result of its resilient construction, each pad 118 will yield upon downward telescopic movement between base member 10 and member 26 and their respective piston and cylinder portions. Such resilient yielding facilitates the roller bearings in rolling rather than skidding on the adjacent contacting walls. Bumpers 116 and pads 118 may be made from rubber or a similar resilient, elastomeric material.

It can thus be seen that roller bearings 114a, 114b, 114c and 114d permit free relative axial and angular or tilting movement between base member 10 and member 26 and their respective piston and cylinder portions, while preventing any relative lateral movement therebetween. The use of such roller bearings results in a number of advantages as compared to prior art load cell structures using ball bearings for resistance to cross loading. For one thing they permit the load cell to function satisfactorily without binding under extremely high levels of cross loading. This is probably attributable to the continuous rolling contact of each roller bearing along its length adjacent its sidewalls, as contrasted to the point rolling contact made by ball bearings in a similar application. Also, the combination of a square configuration with roller bearings provides much higher resistance to torque than could be achieved with ball bearings in a circular race. Further, because any cross loading is uniformly distributed along the length of each roller bearing, they are much less subject to failure under high levels by loading than are individual ball bearings. Single roller bearings are still further advantageous in that they allow for economies in the construction of the load cell. However, although single roller bearings are most advantageous, it is contemplated that several roller bearings might be used in each race without departing from the scope of the invention.

The flexible diaphragm of the cell of the invention also preferably functions as an integral protective jacket for the roller bearings. For this purpose diaphragm 66 is provided with an extended lateral flange 120 (FIGS. 1, 2 and 5). Flange 120 extends over each race and the roller bearing therein, and out to the edge of rim 20 on base member 10. A separate sealing strip 122 secured to the top of each side of rim 20 by a plurality of cap screws 124 or the like (FIGS. 1 and 2) serves to clamp flange 120 of diaphragm 66 securely and in a dusttight manner to base member 10. The second flange 120 thus serves as an integral protective jacket which overlies and seals each race to protect it and the bearing therein against intrusion of dust or other abrasive or corrosive contaminants in the atmosphere. Flange 120 is also preferably provided with a ring-shaped, convexly deformed portion 120a which provides sufficient slack in the flange to prevent it from being overstressed or ruptured by the relative axial and angular movement of base member 10 and member 26.

The load cell may also be provided with a gauging hole 126 (FIGS. 1 and 2) on one or more ends of base member 10. Gauging holes 126 permit the insertion of a feeler gauge or the like to measure the gauging clearance "d" (FIG. 2). Each gauging hole 126 may be sealed when not in use by a removable threaded plug (not shown). By having the gauging holes located in base member 10 as shown, gauging may be accomplished without disturbing the protective jacket over each race.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which, as a matter of language, might be said to fall therebetween.

Having described our invention, what we claim as new and desire to secure by Letters Patent is:

1. A load cell particularly adapted to the measurement of tensile loads comprising, in combination:
    A. a piston carrying member including a piston portion in the shape of a raised ring surrounding a central depressed well having an opening therethrough,
    B. a cylinder defining member assembled for telescopic movement relative to said piston carrying member and comprising
        1. a cap block having an opening therethrough communicating with the opening through said piston carrying member,
        2. an inner cylinder ring secured to said cap block and surrounding the cap block opening, said inner cylinder ring projecting into the well of said piston portion and being of smaller diameter than said well to provide a first clearance space therebetween,
        3. an outer cylinder ring secured to said cap block and surrounding said piston portion but spaced therefrom to leave a second clearance space therebetween, said piston portion thereby projecting telescopically into a cooperating, ring-shaped cylinder portion defined between said inner and outer cylinder rings,
    C. a flexible diaphragm of sheet material interposed between said piston and cylinder portions and having an opening therethrough communicating with the openings through said cap block, inner cylinder ring and piston carrying member to provide an open passage through said load cell, said diaphragm being clamped in a fluidtight manner between said inner cylinder ring and said cap block and between said outer cylinder ring and said cap block, and laying over the top of said piston portion with slack folds thereof extending into said first and second clearance spaces whereby said diaphragm is capable of withstanding relative movement and forms a sealed, fluid pressure chamber between said cylinder and piston portions,
    D. means forming an elongated race extending perpendicularly to the axis of said load cell between each of and extending substantially the length of the adjacent, telescoped sides of said piston carrying member and said cylinder defining member, and
    E. at least one roller bearing supported in a single plane in each said race said roller bearings extending substantially the length of and in rolling contact with said adjacent telescoped sides to permit free relative axial and angular movement between said piston carrying member and said cylinder defining member and thereby substantially reduce the possibility of binding due to cross loading.

2. A load cell as defined in claim 1 wherein the telescoped sides of said piston carrying member and said cylinder defining member are of polygonal configuration, each said race being linear and extending substantially the length of its corresponding sides, and at least one linear roller bearing disposed in each said race and extending substantially the length thereof, said polygonally oriented roller bearings thereby providing high resistance to torque.

3. A load cell as defined in claim 1 wherein said race forming means comprise a flange on said piston carrying member surrounding said piston portion and terminating in a raised rim of polygonal configuration surrounding and spaced from said outer cylinder ring, and a correspondingly polygonal shaped outer surface on said outer cylinder ring facing said rim, said roller bearings being positioned in the spaces between each of the outer sides of said outer cylinder ring and the corresponding inner sides of said rim with each said roller bearing extending perpendicularly to the axis of said load cell and being in rolling contact with each of said sides to permit free relative axial and angular movement between said piston carrying and cylinder defining members.

4. A load cell as defined in claim 1 wherein said roller bearing races are positioned laterally from said fluid pressure chamber, said flexible diaphragm being extended laterally and secured over said races to form a protective jacket against intrusion of dust or other contaminants.

5. A load cell particularly adapted to the measurement of tensile loads comprising, in combination:
    A. a piston carrying member including
        1. a piston portion in the shape of a raised ring surrounding a central depressed well having an opening therethrough, and
        2. a flange surrounding said piston portion and terminating in a raised rim of polygonal configuration,
    B. a cylinder defining member assembled for telescopic movement relative to said piston carrying member and comprising
        1. a cap block having an opening therethrough communicating with the opening through said piston carrying member,
        2. an inner cylinder ring secured to said cap block and surrounding the cap block opening, said inner cylinder ring projecting into the well of said piston portion and being of smaller diameter than said well to provide a first clearance space therebetween,
        3. an outer cylinder ring having an outer polygonal shaped surface corresponding to the shape of said rim, said outer cylinder ring being secured to said cap block with said polygonal shaped surface in spaced telescopic relation to said rim to form elongated races therebetween and surrounding said piston portion but spaced therefrom to leave a second clearance space, said piston portion thereby projecting telescopically into a cooperating, ring-shaped cylinder portion defined between said inner and outer cylinder rings,
    C. a flexible diaphragm of sheet material interposed between said piston and cylinder portions and having an opening therethrough communicating with the openings through said cap block, inner cylinder ring and piston carrying member to provide an open passage through said load cell,
        1. said diaphragm being clamped in a fluidtight manner between said inner cylinder ring and said cap block and between said outer cylinder ring and said cap block, and laying over the top of said piston portion with slack folds thereof extending into said first and second clearance spaces whereby said diaphragm is capable of withstanding relative movement and forms a sealed, fluid pressure chamber between said cylinder and piston portions, 2. said diaphragm further being extended laterally and secured over said races to form a protective jacket against intrusion of contaminants, and
D. at least one roller bearing in each said race in rolling contact with the adjacent telescoped surfaces of said outer cylinder ring and said rim to permit free relative axial and angular movement between said piston carrying member and said cylinder defining member and thereby substantially reduce the possibility of binding due to cross loading.